Patented June 14, 1938

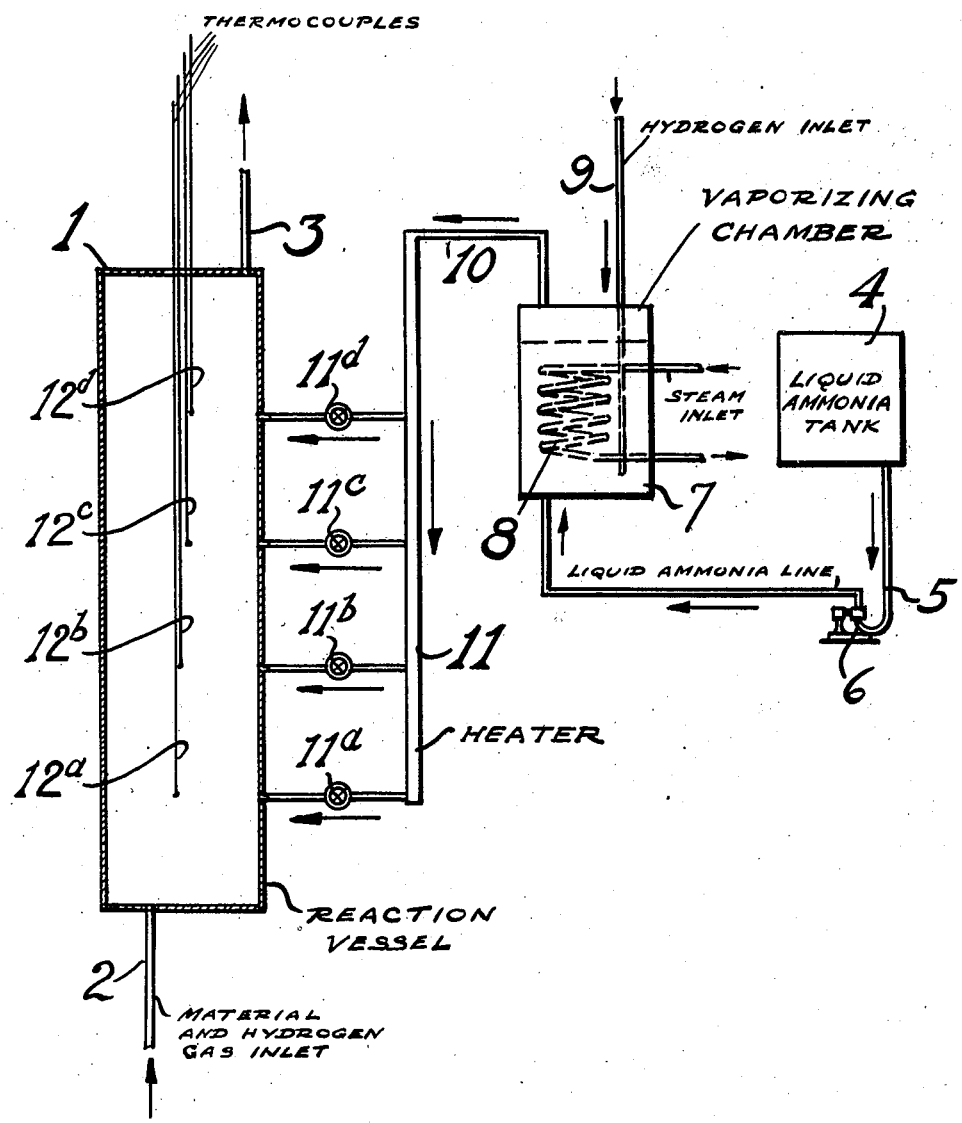

2,120,295

UNITED STATES PATENT OFFICE 2,120,295

DESTRUCTIVE HYDROGENATION OF CARBONACEOUS MATERIALS

Mathias Pier, Heidelberg, and Ernst Donath, Mannheim, Germany, assignors to Standard-I. G. Company, Linden, N. J., a corporation of Delaware Application August 6, 1935, Serial No. 34,910 In Germany August 11, 1934

2 Claims. (Cl. 196—53)

The present invention relates to the destructive hydrogenation of carbonaceous materials, in particular to the regulation of the temperature in this conversion.

The drawing is in diagrammatic form and shows a suitable apparatus for carrying out the present process.

It has already been proposed to prevent undesired rises of the temperatures prevailing in the destructive hydrogenation of carbonaceous materials of the nature of coals, tars, mineral oils, their distillation and conversion products and like substances by supplying into the reaction vessel cold or only moderately heated hydrogen or oil. Instead of hydrogen also gases rich in hydrogen or nitrogen or methane have been added as cooling agents. These gases, however, are not substantially more efficient than pure hydrogen. It has further been suggested to arrange in the reaction vessel cooling devices by means of which the heat evolved is removed by indirect heat exchange between the materials under treatment and the cooling medium passing through the said cooling devices. However, the said methods have not proved to avoid completely and in any case undesired rises of the temperature, and it has been found that by the said undesired rises the activity of the catalysts is appreciably reduced even for the periods at which the temperature has attained again the desired height so that after adjusting the normal reaction conditions smaller yields of the desired products are obtained than before the said rises of the temperature.

We have now found that the aforesaid disadvantage may be avoided if as soon as the temperature rises to an undesired height, that is to say if it suddenly rises by more than from 5 to 20° centigrade or more degrees above the normal conversion temperature, ammonia is added to the reacting materials for such a long time and in such an amount that the temperature is reduced again to the height desired for the conversion. The operation according to the present invention has the advantage that the activity of the catalyst is not reduced for the period of the reaction after shutting off the supply of ammonia and that after this shutting off the conversion again proceeds with the previous speed.

The addition of ammonia has proved to be efficient for reducing the temperature in the case of any hydrogenation catalyst. As catalysts are satisfactorily employed the oxides, halides and preferably the sulphides of heavy metals from groups 2 to 8 of the periodic system, in particular of the metals from the 6th group.

Depending on the particular nature of the initial materials, on the nature of the desired final products, on the velocity of flow of the materials under treatment and on other conditions the destructive hydrogenation is effected at temperatures between 300° and 600° C., preferably between 380° and 550° C. and under pressures above 20 atmospheres, preferably above 50 atmospheres. By any accidental cause, for example by a nonuniform velocity of flow in a reaction vessel provided with a rigidly arranged catalyst or by an agglomeration of finely divided catalyst particles finely dispersed in the initial materials considerable local rises in temperature may occur. As soon as such rise in temperature takes place ammonia is added according to the present invention, preferably in admixture with hydrogen, to the hydrogenating gas in an amount usually ranging up to 30 per cent and preferably between 5 and 10 per cent of the volume of the hydrogenating gas. In these amounts the ammonia effects within a short time a reduction of the reaction temperature down to the normal conversion temperature so that the supply of ammonia may soon be shut off. In order to bring the ammonia as rapidly as possible to the place of the temperature rise which in most cases is only local it is of advantage to provide for its introduction directly before the reaction vessel or into the reaction vessel at any suitable place and, if desired, at several places, or in the case of the use of several reaction vessels before each reaction vessel.

The following example will further illustrate the present invention; the invention is, however, not restricted to the operation shown in this particular example.

Example

A middle oil derived from mineral coal is passed in the vapor phase under a hydrogen pressure of 200 atmospheres over a catalyst consisting of tungsten disulphide, 55 per cent of the middle oil thus being converted into benzine. The heat evolved by the conversion raises the temperature so that in order to maintain a medium reaction temperature of 420° C. cooling must be effected by the addition of cold hydrogen at five successive places of the reaction vessel. If the amount of the cooling gas supplied at one of the places is reduced by some accidental cause the temperature at this place suddenly rises by reason of the increase of the reaction speed at higher temperatures so that the temperature can be reduced only by the supply of a greater amount of cold hydrogen and shutting off of the oil supply. In most cases a consequent reduction of the activity of the catalyst cannot be avoided since sufficient amounts of cooling gas are not always available and since furthermore the shutting off of the oil supply does not immediately effect a temperature fall because the oil present in the preheater and heat-exchangers still passes into the reaction vessel. If in such case ammonia is added in an amount of 5 per cent to the hydrogen at a place before the reaction vessel an immediate reduction of the temperature is attained. After shutting off this supply of ammonia the conversion proceeds again with the same speed as before the rise of the temperature from which fact it results that the catalyst again promotes the reaction with the same activity as previously. The interruption of the normal operation by the supply of ammonia requires only a very short time.

In the drawing, reference numeral 1 designates a reaction vessel in which the hydrogenation may be accomplished. The mixture of material to be hydrogenated and hydrogen gas is introduced through the pipe 2 and the reaction products are removed by the pipe 3. The apparatus is adapted to withstand the high temperatures and pressures required for the reaction. Numeral 4 indicates a tank which is to contain liquid ammonia. This is removed from the tank by a pipe 5 and a pump 6 which forces the ammonia into a vaporizing chamber 7 which may be heated by suitable means such as an internal steam coil 8. This vessel is to be maintained at a pressure slightly above that of the reaction chamber 1 and hydrogen may be introduced into this vessel by a pipe 9 to assist in vaporizing the ammonia. The vaporized ammonia together with the hydrogen flows through a pipe 10 and into a heater 11 from which it may be added to the reaction vessel through the valved lines 11a, 11b, 11c and 11d. Thermocouples 12a, 12b, 12c and 12d are provided to measure the temperatures at or near points corresponding to those at which the mixture of ammonia and hydrogen is added and the amount added at the several points may be regulated by the temperature shown on the thermocouples as will be understood.

If, however, the overheating of the reaction space is removed in the manner hitherto known by the addition of cooling gases other than ammonia, such as cold hydrogen or nitrogen, the reduction of the temperature takes place but slowly, and by the overheating for a relatively long time the activity of the catalyst is permanently reduced to such an extent that the yield in benzine obtained under the same conditions is reduced by from 15 to 20 per cent.

What we claim is:—

1. In the destructive hydrogenation of carbonaceous materials by the action of hydrogen at a working temperature between 300° and 600° C. under an elevated pressure of at least 20 atmospheres and in the presence of a solid hydrogenation catalyst, the step of eliminating undesired rises in temperature above said working temperature by adding ammonia to the reaction space in such an amount and for such a time that the temperature is reduced again to the said working temperature.

2. In the process as claimed in claim 1 adding ammonia in an amount of from 5 to 30 per cent of the volume of the hydrogenating gas for such a time that the temperature is reduced to said working temperature.

MATHIAS PIER.
ERNST DONATH.